(12) United States Patent
Khurana et al.

(10) Patent No.: US 10,873,092 B2
(45) Date of Patent: Dec. 22, 2020

(54) FUEL CELL INTERCONNECT WITH REDUCED VOLTAGE DEGRADATION AND MANUFACTURING METHOD

(71) Applicant: BLOOM ENERGY CORPORATION, Sunnyvale, CA (US)

(72) Inventors: Sanchit Khurana, Sunnyvale, CA (US); Tad Armstrong, Burlingame, CA (US); Harald Herchen, Los Altos, CA (US); Emily Wong, Berkeley, CA (US); Cheng-Yu Lin, Cupertino, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 84 days.

(21) Appl. No.: 15/903,363

(22) Filed: Feb. 23, 2018

(65) Prior Publication Data

US 2018/0248202 A1    Aug. 30, 2018

Related U.S. Application Data

(60) Provisional application No. 62/463,979, filed on Feb. 27, 2017.

(51) Int. Cl.
*H01M 2/02* (2006.01)
*H01M 8/0202* (2016.01)
(Continued)

(52) U.S. Cl.
CPC ....... *H01M 8/0202* (2013.01); *H01M 4/0471* (2013.01); *H01M 8/021* (2013.01);
(Continued)

(58) Field of Classification Search
CPC ..... H01M 8/0202–0269; H01M 8/021; H01M 8/0223; H01M 8/0228
(Continued)

(56) References Cited

U.S. PATENT DOCUMENTS 6,430,966 B1    8/2002    Meinhardt et al.
7,951,509 B2    5/2011    Cassidy et al.
(Continued)

OTHER PUBLICATIONS

Schott: Glass and Glass-Ceramic Sealants for Soild Oxide Fuel Cells, archived webpage from Jul. 7, 2012 accessed through archive. org. (Year: 2012).*
(Continued)

*Primary Examiner* — James M Erwin
(74) *Attorney, Agent, or Firm* — The Marbury Law Law Group PLLC

(57) ABSTRACT

A method of making an interconnect for a solid oxide fuel cell stack includes contacting an interconnect powder located in a die cavity with iron, the interconnect powder including a chromium and iron, compressing the interconnect powder to form an interconnect having ribs and fuel channels on a first side of the interconnect, such that the iron is disposed on tips of the ribs; and sintering the interconnect, such that the iron forms an contact layer on the tips of the ribs having a higher iron concentration than a remainder of the interconnect. A glass containing cathode contact layer having a glass transition temperature of 900° C. or less may be located over the rib tips on the oxidant side of the interconnect.

11 Claims, 10 Drawing Sheets

(51) Int. Cl.
  *H01M 8/12*     (2016.01)
  *H01M 4/04*     (2006.01)
  *H01M 8/021*    (2016.01)
  *H01M 8/0223*   (2016.01)
  *H01M 8/0228*   (2016.01)
  *H01M 8/124*    (2016.01)
  *H01M 4/86*     (2006.01)

(52) U.S. Cl.
  CPC ....... *H01M 8/0223* (2013.01); *H01M 8/0228* (2013.01); *H01M 8/12* (2013.01); *H01M 2004/8684* (2013.01); *H01M 2004/8689* (2013.01); *H01M 2008/1293* (2013.01); *Y02P 70/50* (2015.11)

(58) Field of Classification Search
  USPC .......................................................... 429/535
  See application file for complete search history.

(56) References Cited

U.S. PATENT DOCUMENTS

| | | | |
|---|---|---|---|
| 8,420,278 | B2 | 4/2013 | DeRose et al. |
| 9,356,300 | B2 | 5/2016 | DeRose et al. |
| 9,452,475 | B2 | 9/2016 | Armstrong et al. |
| 9,468,736 | B2 | 10/2016 | Darga et al. |
| 2007/0231676 | A1 | 10/2007 | Cassidy et al. |
| 2009/0075125 | A1* | 3/2009 | Gottmann ........... H01M 4/8657 429/529 |
| 2012/0258241 | A1 | 10/2012 | Tucker et al. |
| 2013/0230644 | A1 | 9/2013 | Armstrong et al. |
| 2013/0230792 | A1 | 9/2013 | Wilson et al. |
| 2015/0086897 | A1 | 3/2015 | DeRose et al. |
| 2015/0311538 | A1 | 10/2015 | Batawi et al. |
| 2017/0054159 | A1 | 2/2017 | Armstrong et al. |

OTHER PUBLICATIONS

Corning Museum of Glass: Annealing Glass, webpage originally published on Dec. 9, 2011 (Year: 2011).*

Schott: Technical Glasses; originally published Jan. 2014 (Year: 2014).*

Tucker, M. C. et al., "Glass-Containing Composite Cathode Contact Materials for Solid Oxide Fuel Cells," Journal of Power Sources, vol. 196, pp. 8435-8443, (2011).

* cited by examiner

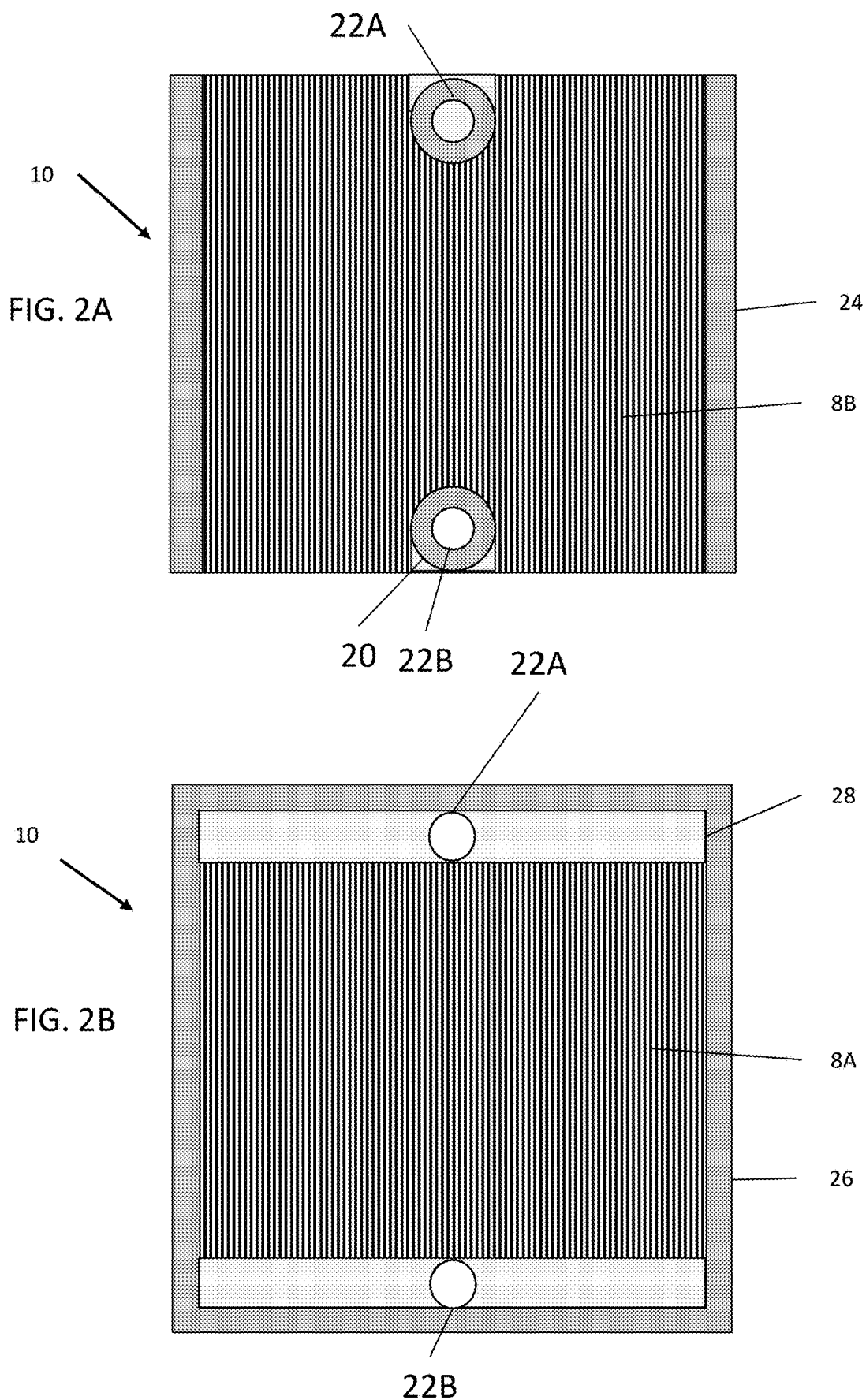

FUEL CELL INTERCONNECT WITH REDUCED VOLTAGE DEGRADATION AND MANUFACTURING METHOD

FIELD

The present invention is directed to fuel cell stack components, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr based alloy such as an alloy known as CrFe which has a composition of 95 wt % Cr-5 wt % Fe, or Cr—Fe—Y having a 94 wt % Cr-5 wt % Fe-1 wt % Y composition. The CrFe and CrFeY alloys retain their strength and are dimensionally stable at typical solid oxide fuel cell (SOFC) operating conditions, e.g. 700-900 C in both air and wet fuel atmospheres. However, during operation of the SOFCs, chromium in the CrFe or CrFeY alloys react with oxygen and form chromia, resulting in degradation of the SOFC stack.

Two of the major degradation mechanisms affecting SOFC stacks are directly linked to chromia formation of the metallic interconnect component: i) higher stack ohmic resistance due to the formation of native chromium oxide (chromia, $Cr_2O_3$) on the interconnect, and ii) chromium poisoning of the SOFC cathode.

Although $Cr_2O_3$ is an electronic conductor, the conductivity of this material at SOFC operating temperatures (700-900 C) is very low, with values on the order of 0.01 S/cm at 850 C (versus $7.9\times10^{-1}$ $Scm^{-1}$ for Cr metal). The chromium oxide layer grows in thickness on the surfaces of the interconnect with time and thus the ohmic resistance of the interconnect and therefore of the SOFC stack due to this oxide layer increases with time.

The second degradation mechanism related to the chromia forming metallic interconnects is known as chromium poisoning of the cathode. At SOFC operating temperatures, chromium vapor diffuses through cracks or pores in the coating and chromium ions can diffuse through the lattice of the interconnect coating material into the SOFC cathode via solid state diffusion. Additionally, during fuel cell operation, ambient air (humid air) flows over the air (cathode) side of the interconnect and wet fuel flows over the fuel (anode) side of the interconnect. At SOFC operating temperatures and in the presence of humid air (cathode side), chromium on the surface of the $Cr_2O_3$ layer on the interconnect reacts with water and evaporates in the form of the gaseous species chromium oxide hydroxide, $CrO_2(OH)_2$. The chromium oxide hydroxide species transports in vapor form from the interconnect surface to the cathode electrode of the fuel cell where it may deposit in the solid form, $Cr_2O_3$. The $Cr_2O_3$ deposits on and in (e.g., via grain boundary diffusion) the SOFC cathodes and/or reacts with the cathode (e.g. to form a Cr—Mn spinel), resulting in significant performance degradation of the cathode electrode. Typical SOFC cathode materials, such as perovskite materials, (e.g., LSM, LSC, LSCF, and LSF) are particularly vulnerable to chromium oxide degradation.

SUMMARY

According to various embodiments, provided is a method of forming an interconnect for a solid oxide fuel cell stack, the method comprising: contacting an interconnect powder located in a die cavity with iron, the interconnect powder comprising chromium and iron; compressing the interconnect powder to form an interconnect comprising ribs and fuel channels on a first side of the interconnect, such that the iron is disposed on tips of the ribs; and sintering the interconnect, such that the iron forms an contact layer on the tips of the ribs having a higher iron concentration than a remainder of the interconnect.

According to various embodiments, provided is a method of forming an interconnect for a solid oxide fuel cell stack, the method comprising: filling a die cavity with an interconnect powder comprising a chromium alloy; compressing the interconnect powder to form an interconnect comprising ribs configured to form fuel channels on a first side of the interconnect; disposing iron on tips of the ribs; and sintering the interconnect, such that the iron forms a contact layer on the tips of the ribs.

According to various embodiments, provided is a fuel cell interconnect, comprising oxidant channels at least partially defined by first ribs disposed on a first side of the interconnect, fuel channels at least partially defined by second ribs disposed on an opposing second side of the interconnect, and a cathode contact layer located only over tips of the second ribs, the cathode contact layer comprising a conductive metal oxide and a glass material having a glass transition temperature of 900° C. or less.

BRIEF DESCRIPTION OF THE DRAWINGS

FIG. 2A is a top view of an air side of an interconnect, according to various embodiments of the present disclosure.

FIG. 2B is a top view of a fuel side of the interconnect of FIG. 2A.

DETAILED DESCRIPTION

Figure 1A:
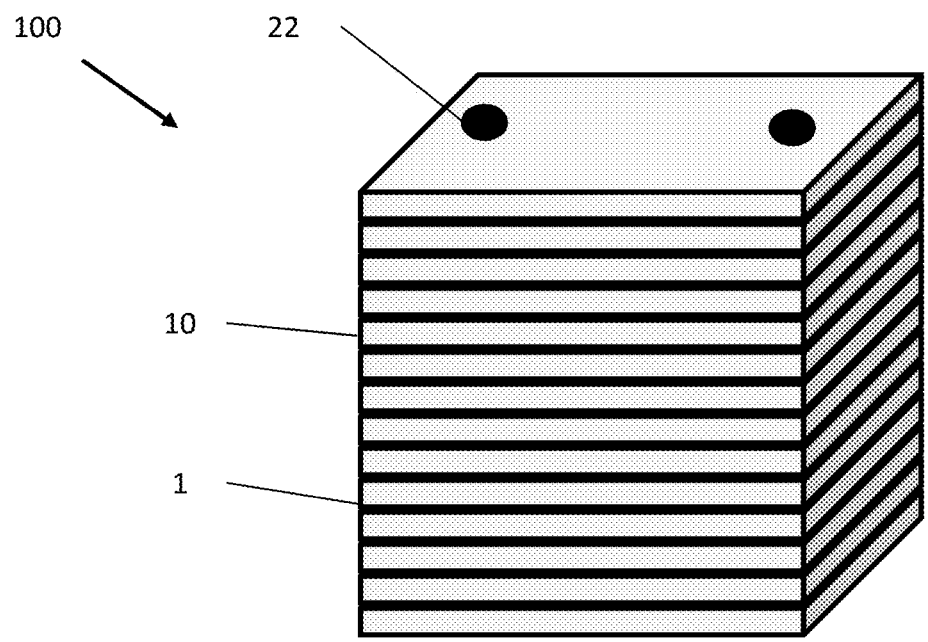
FIG. 1A is a perspective view of a SOFC stack, according to various embodiments of the present disclosure.
Figure 1B:
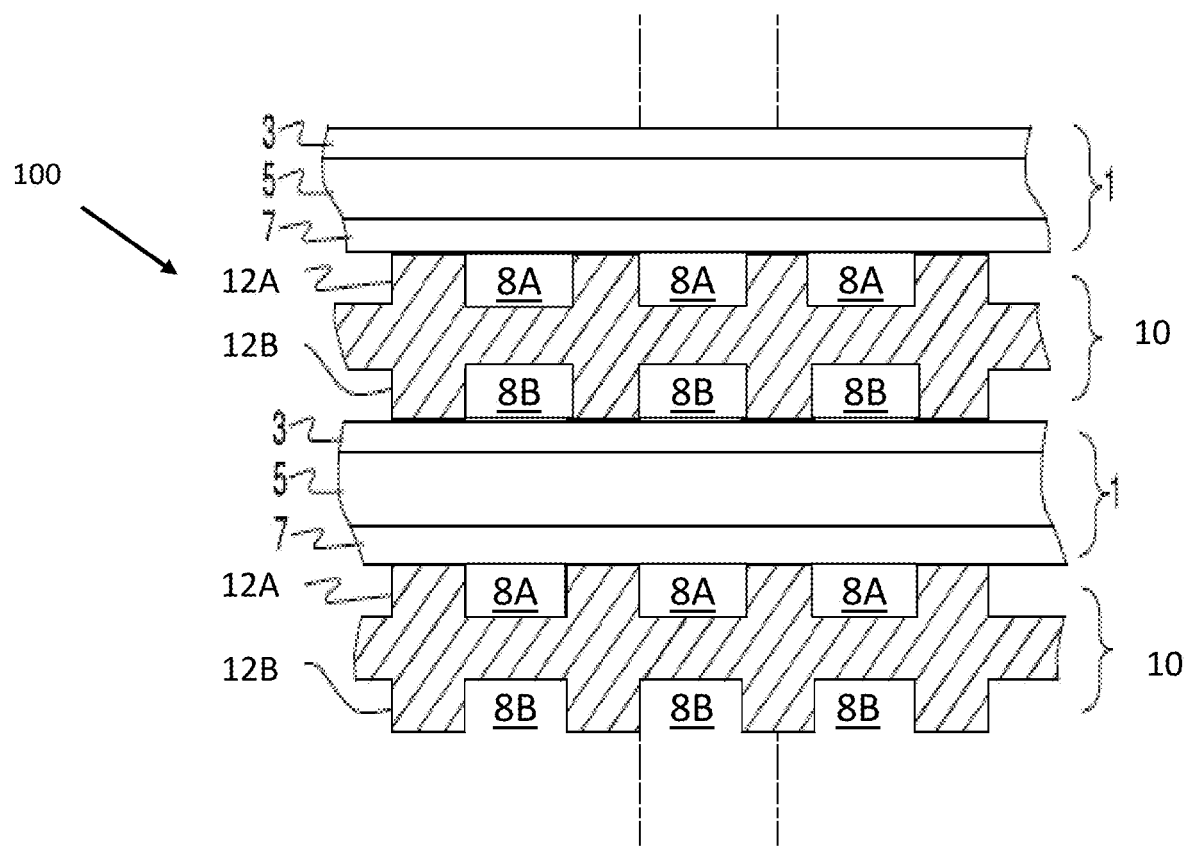
FIG. 1B is a cross-sectional view of a portion of the stack of FIG. 1A.

FIG. 1A is a perspective view of a solid oxide fuel cell (SOFC) stack 100, and FIG. 1B is a sectional view of a portion of the stack 100, according to various embodiments of the present disclosure. Referring to FIGS. 1A and 1B, the stack 100 includes fuel cells 1 separated by interconnects 10. Referring to FIG. 1B, each fuel cell 1 comprises a cathode electrode 3, a solid oxide electrolyte 5, and an anode electrode 7.

Various materials may be used for the cathode electrode 3, electrolyte 5, and anode electrode 7. For example, the anode electrode 3 may comprise a cermet comprising a nickel containing phase and a ceramic phase. The nickel containing phase may consist entirely of nickel in a reduced state. This phase may form nickel oxide when it is in an oxidized state. Thus, the anode electrode 7 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode 3 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 3 may also contain a ceramic phase similar to the anode electrode 7. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large. For example, fuel may be provided through fuel conduits 22 (e.g., fuel riser openings) formed in each interconnect 10.

Each interconnect 10 electrically connects adjacent fuel cells 1 in the stack 100. In particular, an interconnect 10 may electrically connect the anode electrode 7 of one fuel cell 1 to the cathode electrode 3 of an adjacent fuel cell 1. FIG. 1B shows that the lower fuel cell 1 is located between two interconnects 10. As described below, a Ni mesh may be used to electrically connect the interconnect 10 to the anode electrode 7 of an adjacent fuel cell 1.

Each interconnect 10 includes fuel-side ribs 12A that at least partially define fuel channels 8A and air-side ribs 12B that at least partially define oxidant (e.g., air) channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 or less weight percent yttrium and balance chromium alloy), and may electrically connect the anode or fuel-side of one fuel cell 1 to the cathode or air-side of an adjacent fuel cell 1. An electrically conductive contact layer, such as a nickel contact layer, may be provided between anode electrodes 7 and each interconnect 10. Another optional electrically conductive contact layer may be provided between the cathode electrodes 3 and each interconnect 10.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B. Air flows through the air channels 8B to a cathode electrode 3 of an adjacent fuel cell 1. Ring seals 20 may surround fuel holes 22A of the interconnect 10, to prevent fuel from contacting the cathode electrode. Peripheral strip-shaped seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Fuel flows from one of the fuel holes 22A (e.g., inlet hole that forms part of the fuel inlet riser), into the adjacent manifold 28, through the fuel channels 8A, and to an anode 7 of an adjacent fuel cell 1. Excess fuel may flow into the other fuel manifold 28 and then into the outlet fuel hole 22B. A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

The interconnect 10 may be formed of an alloy containing a high amount of chromium (Cr) which forms a protective chromia shell at high temperatures. Unfortunately, at these high temperatures, and especially in wet air environments, the chromia layer evaporates Cr, most notably in the form of $CrO_2(OH)_2$. To help prevent this, the air side surface of the interconnect 10 may be coated with an oxide layer to suppress Cr evaporation from the interconnect 10 and to reduce the growth of oxide scale.

Figure 3:
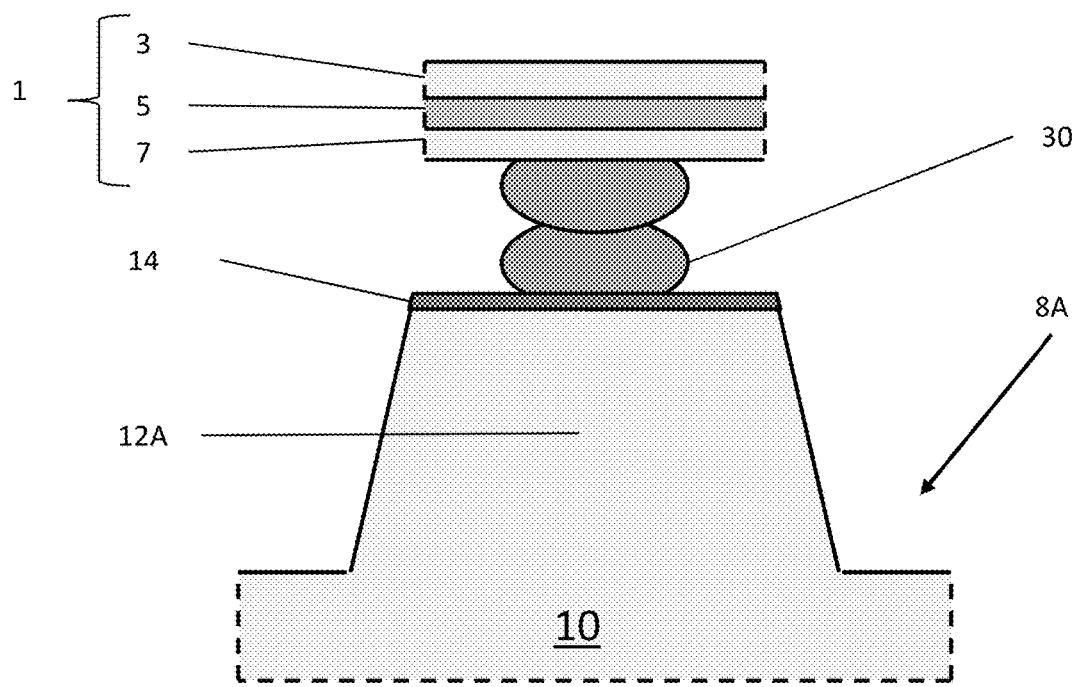
FIG. 3 is a sectional view of a fuel-side rib of an interconnect and an anode of an adjacent fuel cell, according to various embodiments of the present disclosure.

FIG. 3 is a sectional view illustrating one of the fuel-side ribs 12A of the interconnect 10 and the anode 7 of an adjacent fuel cell 1, according to various embodiments of the present disclosure. Referring to FIG. 3, the interconnect 10 is electrically connected to the anode 7 by a Ni mesh 30 covering the fuel side of the interconnect 10. The Ni mesh 30 may operate as a current collector with respect to the anode 7. Although only one fuel-side rib 12A is shown, each fuel-side rib 12A of the interconnect 10 may be connected to the anode 7 in a similar manner.

Conventionally, oxides or other contaminants may form over time on the surface of an interconnect, and in particular, at an interface between a Ni mesh and corresponding ribs of the interconnect. As such, the contact resistance between the Ni mesh and an interconnect may increase, which may reduce the useful life of a fuel cell stack.

Referring again to FIG. 3, the interconnect 10 may include a contact layer 14 configured to prevent or reduce such an increase in contact resistance. In particular, the contact layer 14 may be formed on the tips of the ribs 12A. For example, the contact layer 14 may be disposed at an interface between the interconnect 10 and the Ni mesh 30 (e.g., between the rib 12A and the Ni mesh 30). In some embodiments, the contact layer 14 may cover substantially all of the upper (e.g., distal) surface of the rib 12A. However, in other embodiments, the contact layer 14 may cover only a portion of the tip of the rib 12A.

The contact layer 14 may have a higher iron content than the interconnect 10. For example, the contact layer 14 may have greater than 7 wt % iron, such as from about 10 to about 95 wt % iron, or about 20 to about 80 wt % iron, while the interconnect 10 may include an alloy having from about 4 to about 6 wt % iron. Accordingly, the contact layer 14 may operate to prevent oxide growth at the interface between the rib 12A and the Ni mesh 30. The contact layer 14 may also improve the metallurgical joining of the Ni mesh 30 and the interconnect 10.

In some embodiments, the thickness (e.g., depth) and/or width of the contact layer 14 may be controlled to reduce mechanical distortion of the interconnect 10. For example, the thickness of the contact layer 14 may range from about 5 to about 1000 μm.

The contact layer 14 may have an iron to chromium ratio that varies in the thickness direction thereof. For example, the iron to chromium ratio may decrease as a distance from the tip of the rib 12A increases.

According to various embodiments, the contact layer 14 may be formed by depositing an iron-based material, such as metallic iron or iron oxide, on the tips of the ribs 12A. The interconnect 10 can then be sintered, such that the iron and chromium in the interconnect at least partially inter-diffuse, thereby creating the contact layer 14. In particular, iron of the contact layer 14 may partially diffuse into the tip of the rib 12A, and chromium of the interconnect 10 may partially diffuse into the contact layer 14.

In some embodiments, the contact layer 14 may be formed by disposing iron wire on the tips of the ribs 12A. The interconnect 10 may then be sintered to facilitate iron and chromium inter-diffusion, as described above. The iron wire may have a thickness (e.g., diameter) ranging from about 10 to 300 microns, such as from about 15 to about 250 microns, or from about 20 to about 200 microns.

In some embodiments, the iron wire may be deposited on an interconnect powder, and the resultant structure may be compressed into the shape of an interconnect, followed by sintering. In other embodiments, the iron wire may be deposited on a compressed interconnect, and the resultant structure may then be sintered.

In some embodiments, the contact layer 14 may be formed by contacting an iron powder to the tip of the rib 12A. The iron powder may have an average particle size ranging from about 20 to about 400 microns, such as from about 25 to about 350 microns, or from about 30 to about 300 microns. In some embodiments, the iron powder may be deposited on an interconnect powder, and the resultant structure may be compressed into the shape of an interconnect, followed by sintering. For example, the interconnect powder may be deposited into a die cavity using a first shoe, and then the iron powder may then be deposited onto the interconnect powder using a second shoe or by a spraying process.

In other embodiments, the iron powder may be deposited on a compressed interconnect, or the compressed interconnect may be placed onto the iron powder ribs down, and the resultant structure may then be sintered. Methods of forming interconnects will be discussed in more detail below.

Figure 4:
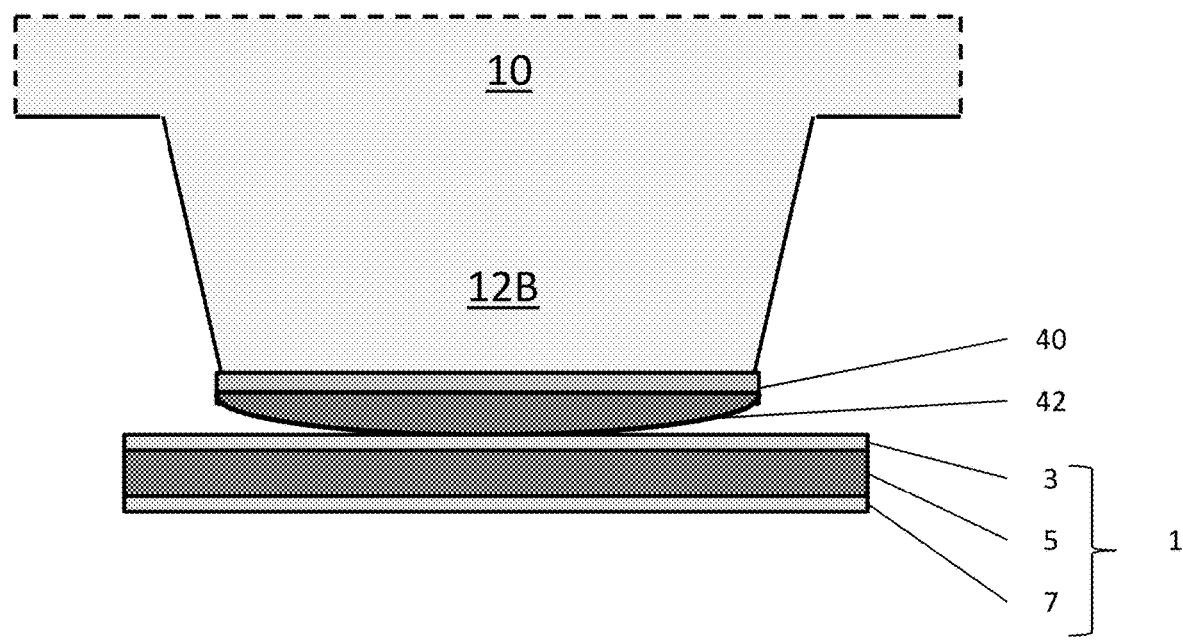
FIG. 4 is a sectional view of a fuel cell connected to the air side of an interconnect, according to various embodiments of the present disclosure.

FIG. 4 is a sectional view of a fuel cell 1 connected to the air side of an interconnect 10, according to various embodiments of the present disclosure. Referring to FIG. 4, a protective coating or layer 40 may be disposed on the air side of the interconnect 10, and a cathode contact layer (CCL) 42 may be disposed on the coating 40. In some embodiments, the protective coating 40 and/or the CCL 42 may be deposited only on the tops of the ribs 12B, for example, by a printing method or the like, without depositing the CCL 42 in the oxidant (e.g., air) channels 8B (i.e., without depositing the CCL on or over the sidewalls of the ribs 12B and/or without depositing the CCL on or over the bottom of the oxidant channels 8B).

The coating 40 may be configured to limit the diffusion of chromium ions (e.g., $Cr^{3+}$) from the interconnect 10 and into cathode 3 and into seals 20, 24. The coating 40 may also be configured to suppress the formation of the native oxide on the surface of the interconnect 10. The native oxide is formed when oxygen reacts with chromium in the interconnect alloy to form a relatively high resistance layer of $Cr_2O_3$. If the interconnect coating 40 can suppress the transport of oxygen and water vapor from the air to the surface of the interconnect 10, then the kinetics of oxide growth can be reduced.

According to various embodiments, the coating 40 may include a metal oxide spinel material, such as a manganese cobalt oxide (MCO) spinel material and/or a perovskite material, such as lanthanum strontium manganite (LSM). In an embodiment, the MCO spinel material encompasses the compositional range from $Mn_2CoO_4$ to $Co_2MnO_4$. That is, any spinel material having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used, such as $Mn_{1.5}Co_{1.5}O_4$, $MnCo_2O_4$ or $Mn_2CoO_4$. The coating 40 may also be a mixed layer of MCO and LSM. Many of the spinels that contain transition metals exhibit good electronic conductivities and reasonably low anion and cation diffusivities and are therefore suitable coating materials. Examples of such materials may be found in U.S. Published Patent Application No. 2013/0230792 and U.S. Pat. No. 9,452,475, which are incorporated herein by reference in their entirety.

The CCL 42 may be an electrically conductive metal oxide layer configured to improve an electrical connection between the interconnect 10 and the cathode 3. In some embodiments, the CCL 42 may include metal oxide materials that have a low cation diffusivity in the perovskite family, such as a lanthanum strontium oxide, e.g., $La_{1-x}Sr_xMnO_3$ (LSM), where $0.1 \leq x \leq 0.3$, such as $0.1 \leq x \leq 0.2$. In the case of LSM, the material has high electronic conductivity yet low anion and cation diffusion. Other perovskites such as $La_{1-x}Sr_xFeO_{3-d}$, $La_{1-x}Sr_xCoO_{3-d}$, and $La_{1-x}Sr_xCo_{1-y}Fe_yO_{3-d}$ all exhibit high electronic conduction and low cation conduction (low chromium diffusion rates) and may be used as the CCL 42.

Such materials generally have sintering temperatures of more than 1000° C. However, such temperatures may result in the oxidation of metal alloys included in the interconnect 10. As such, it may be difficult to properly sinter a CCL.

In view of the above and/or other problems, the CCL 42 may include a sintering aid configured to increase the density of the CCL 42 and to improve interfacial strength, and increase layer bonding. In some embodiments, the CCL 42 may include a glass material as a sintering aid. The glass material may be included at an amount less than about 15 wt %, such as from about 1 to about 10 wt %, such as from about 4 to about 10 wt %, with the remainder of the CCL 42 being a conductive perovskite metal oxide, such as LSM. In particular, glass amounts of greater that about 15 wt % may unnecessarily reduce the conductivity of the CCL 42.

In addition to better sintering, the addition of the glass material may make the CCL 42 more compliant and tolerant to mechanical stresses induced by thermal cycles during SOFC operation. As such, the glass material may be selected from glass materials that have a relatively low glass transition (Tg) or softening temperature, to avoid crystallization. In particular, the glass material may have a Tg or softening temperature that is low enough to allow the glass material to remain viscous at temperatures below 1000° C., such as temperatures of from about 400 to about 900° C. In some embodiments, selected glass materials may have a glass transition temperature of 900° C. or less, such as 825° C. or less, such as ranging from about 450 to about 550° C. For example, the glass material may remain viscous at fuel cell operating temperatures ranging from about 800 to about 900° C., such as from about 830 to about 860° C. Remaining viscous at such temperatures allows the CCL 42 to conform to the tops of the air-side ribs of the interconnect 40. Accordingly, the CCL 42 allows for improved coverage of rib tops, an increased effective contact surface area, reduced degradation, and the ability to self-heal cracks formed during thermal cycling.

According to various embodiments, the glass material may be selected from various compositions, such as alumino-silicate, boro-silicate, boro-aluminate, and alkali-free compositions, and may include Al, Si, Ca, Ba, B, La, Sr, Mg, or mixtures thereof.

Figure 5A:
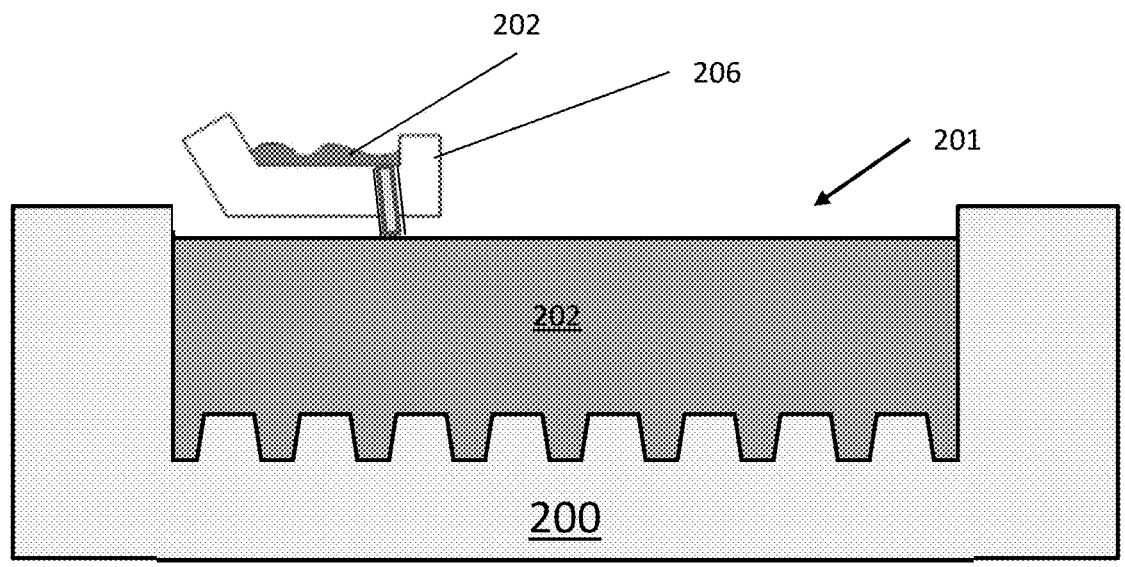
FIGS. 5A-5E illustrate a method of forming an interconnect, according to various embodiments of the present disclosure.
Figure 5B:
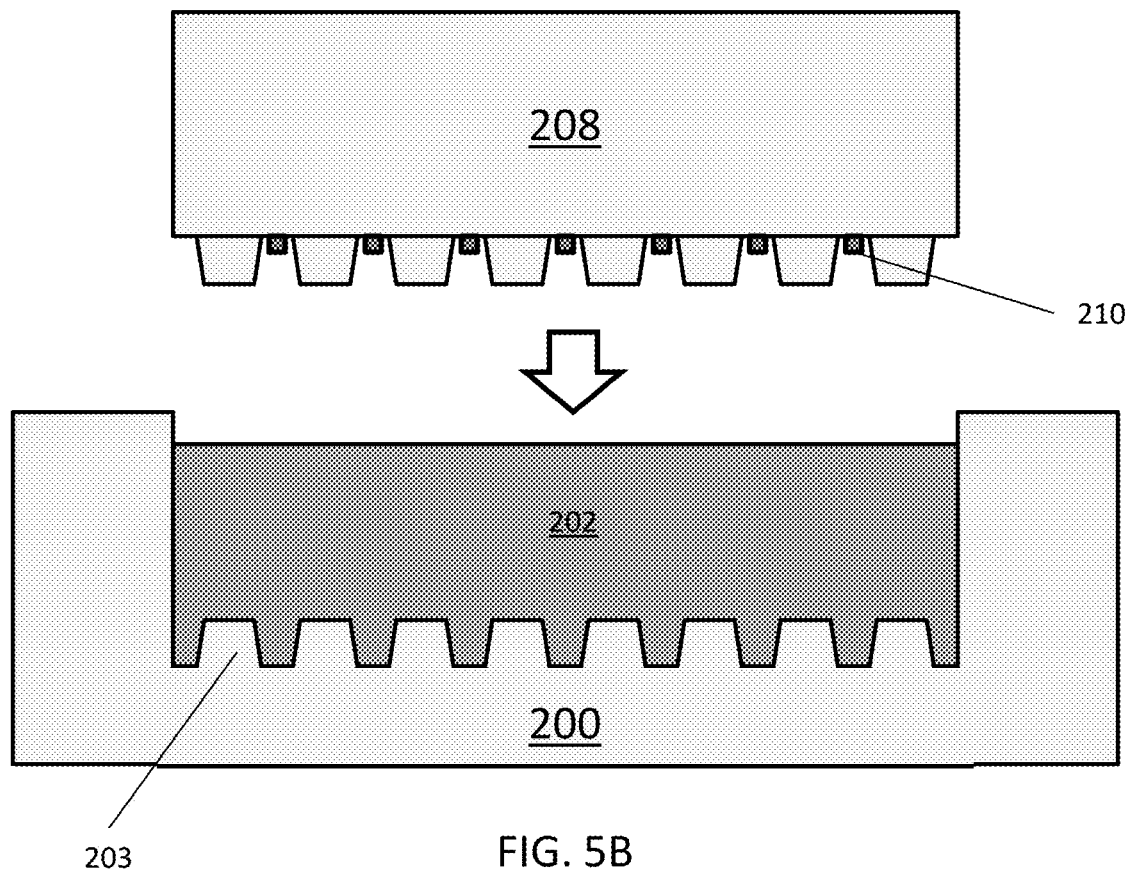
Figure 5C:
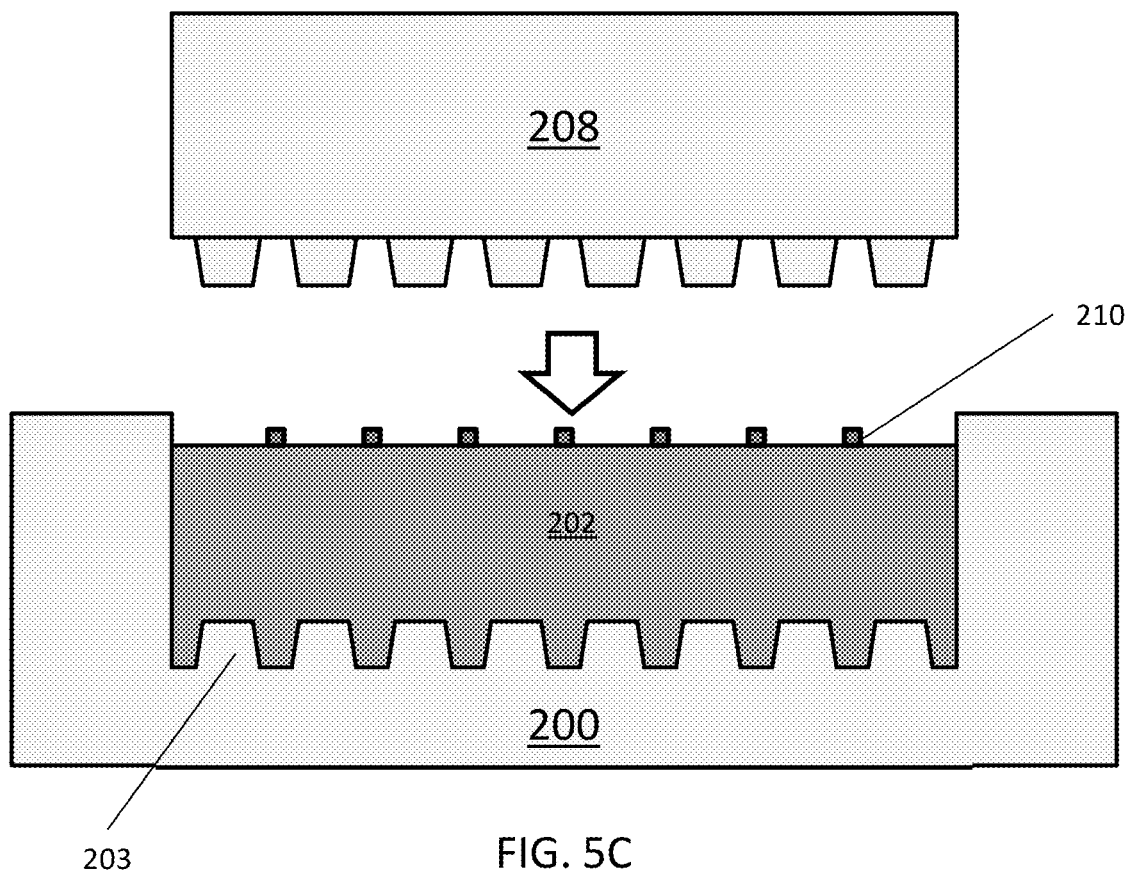

FIGS. 5A-5C illustrate a method for forming an interconnect, according to various embodiments of the present disclosure. Referring to FIG. 5A, in a first step of the method, an interconnect powder 202 may be added to a die cavity 201 in a lower punch (die) 200, using a first shoe 206. However, the interconnect powder 202 may be loaded into the die cavity 201 by any suitable method. The interconnect powder 202 may include any suitable interconnect material. For example, the interconnect powder 202 may include iron and chromium powders, or may include a chromium alloy powder (e.g., a Cr/Fe alloy powder including 4-6 wt % Fe and a remainder of Cr). The interconnect powder 202 may optionally include a lubricant to facilitate compaction.

Referring to FIG. 5B, in a second step of the method, a contact layer material 210 may be disposed on the interconnect powder 202. The contact layer material 210 may be an iron-containing material, such as metallic iron or iron oxide, and may be in the form of a powder or a wire. As such, the contact layer material 210 is referred to herein as iron 210.

As shown in FIG. 5B, iron 210 may be disposed between ribs of a punch press (i.e., upper die) 208. For example, iron wire or powder may be disposed between ribs of the punch 208. The iron powder and/or wire may have a thickness of from about 20 to about 200 μm. For example, the iron 210 may be electro-statically attracted to the punch 208. The punch 208 may then compresses the interconnect powder 202 to form an interconnect.

In the alternative, as shown in FIG. 5C, the iron 210 may be disposed on the interconnect powder 202. The iron 210 may be arranged, such that when the interconnect powder 202 is compressed by the punch 208, the iron 210 is disposed between ribs of the punch 208. When in powder form, the iron 210 may be deposited using a second shoe, a spray deposition method, a screen printing method, or the like. When in the form of wire, the iron 210 may be arranged using a jig or the like.

Figure 5D:
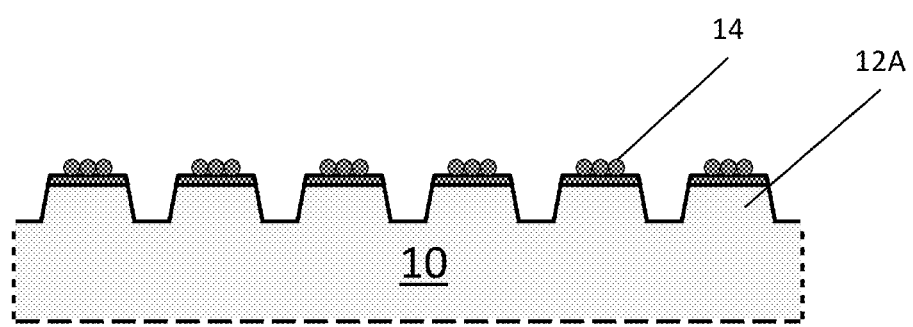

FIG. 5D is a partial sectional view of an interconnect 10 formed by the compression steps of FIG. 5B or 5C. As shown in FIG. 5D, the compression and alignment of the iron 210 results in the formation of contact layer 14 on the tips of ribs 12A of the interconnect 10.

Figure 5E:
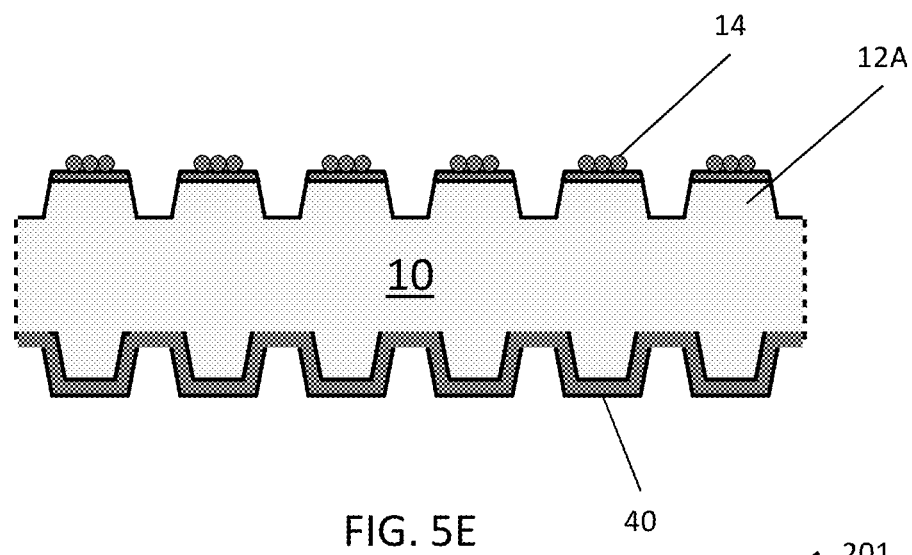

The method may then include sintering of the interconnect 10. The sintering may result in partial inter-diffusion of the interconnect material and the iron of the contact layer 14. As shown in FIG. 5E, a coating material may be applied to the air side of the interconnect 10, prior to the sintering, to form a protective layer 40. The protective layer 40 and the contact layer 14 may be sintered at the same time. In the alternative, the protective layer 40 may be applied after sintering the interconnect 10. The coating material may include, for example, LSM and/or MCO, or a mixture of the coating material and the interconnect powder 202.

For example, the coating material be applied using a spray method, such as an air plasma spray (APS), or may be applied using a coating method, such as a wet coating method using a coating material ink. The APS process is a thermal spray process in which powdered coating materials are fed into the coating apparatus. The coating particles are introduced into a plasma jet in which they are melted and then accelerated toward the substrate. On reaching the substrate, the molten droplets flatten and cool, forming the coating. The plasma may be generated by either direct current (DC plasma) or by induction (RF plasma). Further, unlike controlled atmosphere plasma spraying (CAPS) which requires an inert gas or vacuum, air plasma spraying is performed in ambient air.

The sintering process may be adjusted to keep one or both of the powders oxidized and/or stable. For example, sintering may be performed using wet hydrogen, or in an inert atmosphere, such as nitrogen, argon or another noble gas. The wet hydrogen or inert gas atmosphere is oxidizing or neutral, respectively, and thereby prevents the oxide powder from reducing.

Although not shown, a CCL may be formed on the protective layer 40. In addition, the first step of the method may include depositing a coating material (e.g., coating powder) in the die cavity 201, prior to depositing the interconnect powder 202. In this manner, the protective coating material may form a protective coating primarily on the air side of the interconnect 10.

According to other embodiments, the method may include applying a coating material after the interconnect powder 202 has been compressed.

The ratio of the coating powder and Fe in the Cr—Fe alloy is preferably selected so that the coating material has a similar coefficient of thermal expansion (CTE) to that of the sintered and oxidized interconnect. The coefficient of thermal expansion of the Cr—Fe alloy is a function of the composition of the alloy and can be chosen by selecting a Cr to Fe ratio.

In other embodiments, the method may further include applying a cathode contact layer (CCL) to the protective coating, and then sintering the resultant interconnect. The CCL may be formed from the materials described above, such as a mixture of a glass material and a conductive perovskite, such as LSM.

Figure 6A:
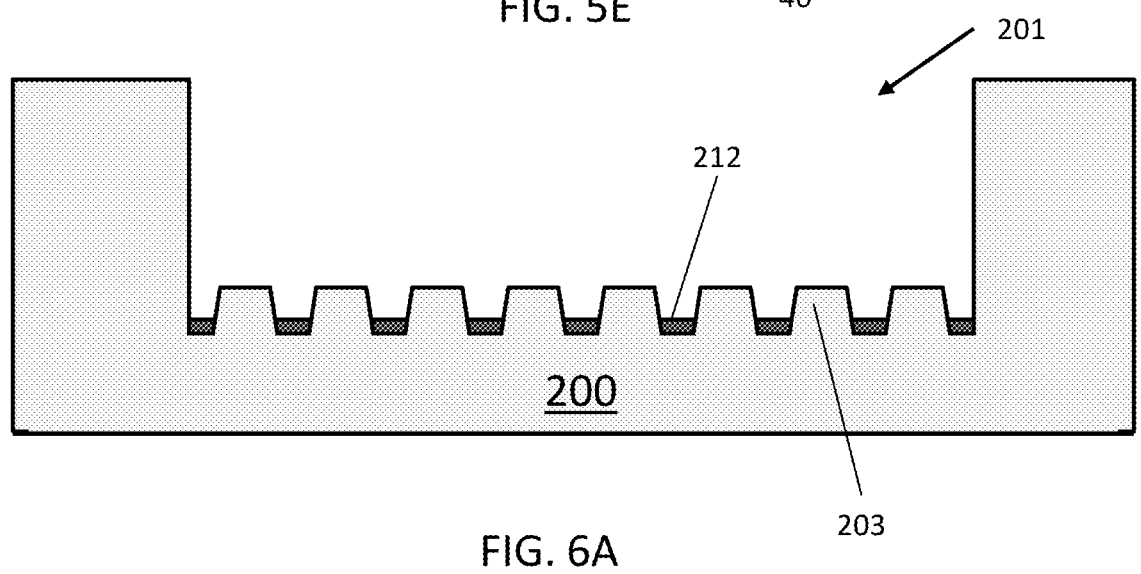
FIGS. 6A-6E illustrate a method of forming an interconnect, according to various embodiments of the present disclosure.

FIGS. 6A-6D illustrate a method of forming an interconnect, according to various embodiments of the present disclosure. Referring to FIG. 6A, a first step of the method includes filling a die cavity 201 with a contact powder 212.

In particular, the contact powder 212 may be an iron-based powder, such as metallic iron or iron oxide, for forming a contact layer, as described above (e.g., a 30-300 μm average particle size powder). An amount of the contact powder 212 may be controlled, such that ribs 203 in the bottom of the die cavity 201 protrude through the contact powder 212. In some embodiments, the die cavity 201 may be vibrated to insure the contact powder 212 is disposed between the ribs 203 at the bottom of the lower punch 200.

Figure 6B:
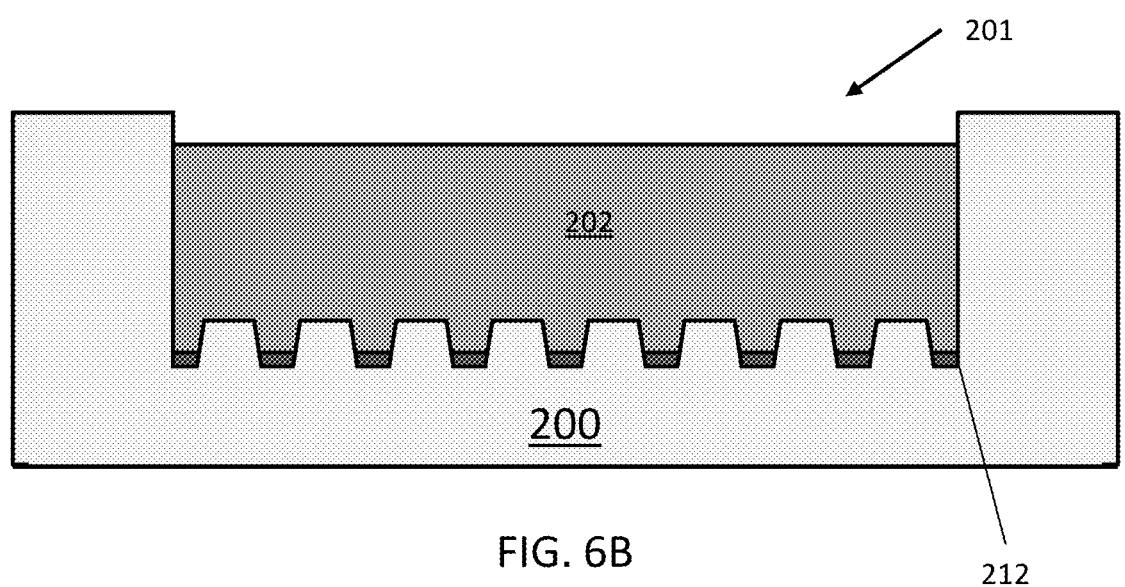

Referring to FIG. 6B, an interconnect powder 202 may be deposited in the die cavity 201 over the contact powder 212. The interconnect powder 202 may be deposited using a shoe or other suitable method, and may include any of the interconnect materials described herein.

Figure 6C:
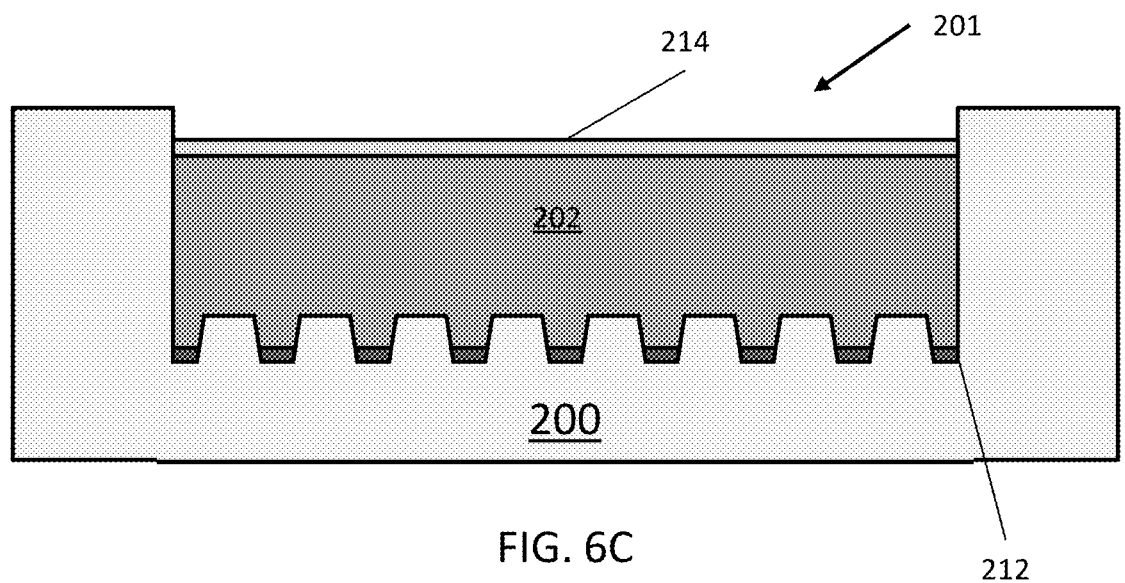

Referring to FIG. 6C, a protective powder 214 may optionally be deposited on the interconnect powder 202. The protective powder 214 may be deposited using a shoe or other suitable method, and may include any of the protective layer materials described herein (e.g., MCO and/or LSM).

Figure 6D:
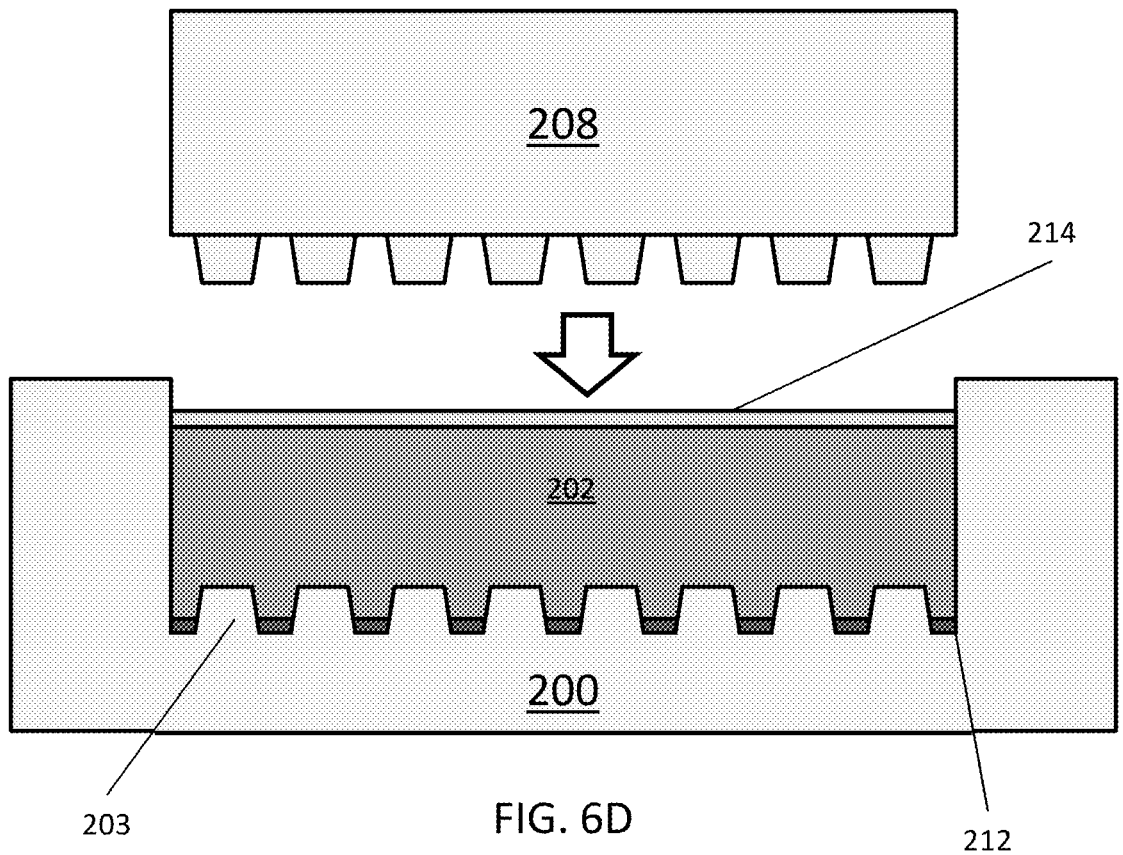
Figure 6E:
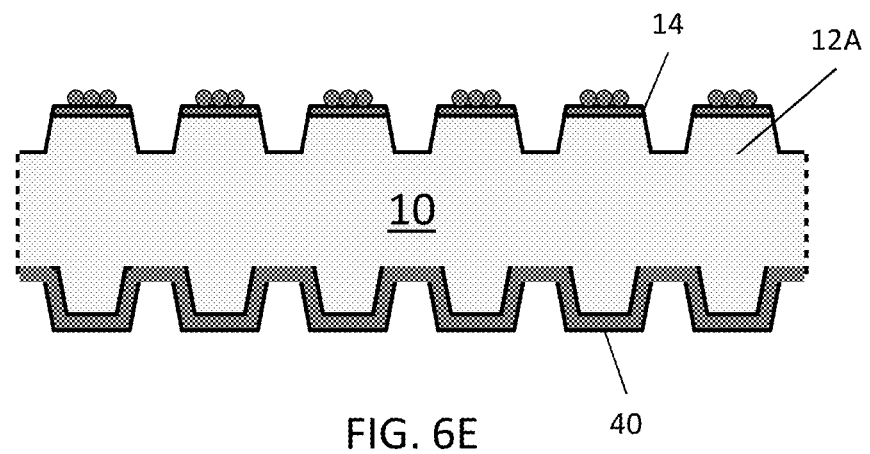

Referring to FIG. 6D, a punch press 208 may be used to compress the powders in the die cavity 201 into the shape of an interconnect 10 including contact layer 14 and a protective layer 40, as shown in FIG. 6E.

Figure 7A:
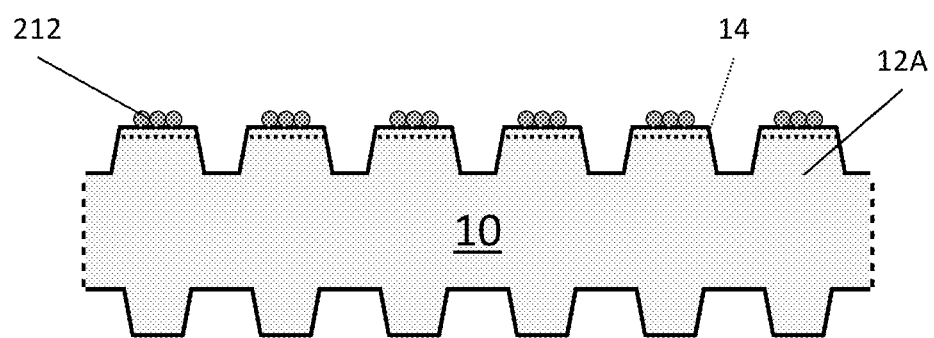
FIG. 7A illustrates a method of forming contact regions on an interconnect, according to various embodiments of the present disclosure.

FIG. 7A illustrates a method of forming contact regions on an interconnect, according to various embodiments of the present disclosure. Referring to FIG. 7A, contact powder 212 may be disposed on ribs 12A extending from an upper surface of a previously pressed and/or sintered interconnect 10. The interconnect 10 may then be sintered, such that the contact powder 212 forms a contact layer 14 at the tips of the ribs 12A.

Figure 7B:
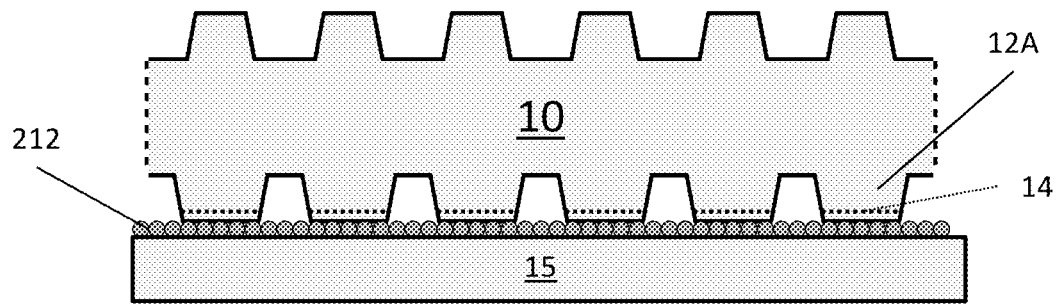
FIG. 7B illustrates an alternative to the method of FIG. 7A, according to various embodiments of the present disclosure.

FIG. 7B illustrates an alternative to the method of FIG. 7A, according to various embodiments of the present disclosure. Referring to FIG. 7B, a layer of contact powder 212 may be disposed on a substrate 15. A previously pressed and/or sintered interconnect 10 may be disposed on the layer of contact powder 212, such that ribs 12A extending from a lower surface of the interconnect 10 contact the contact powder 212. The interconnect 10 may then be sintered, such that the contact powder 212 forms a contact layer 14 at the tips of the ribs 12A.

Figure 8:
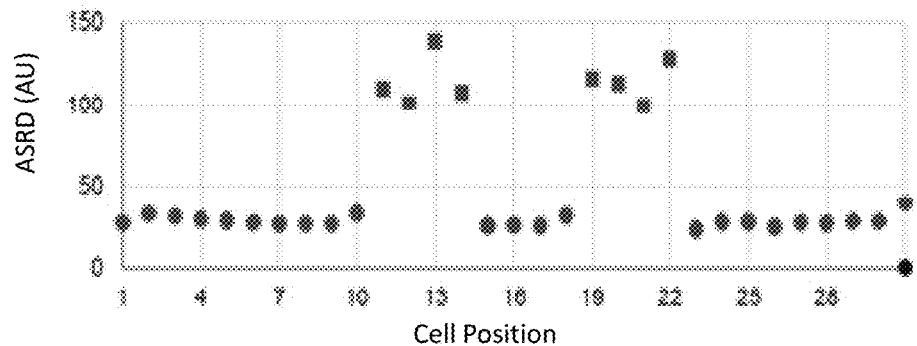
FIG. 8 is a chart showing area specific resistance degradation (ASRD) values of exemplary and comparative interconnects disposed in a fuel cell stack, according to various embodiments of the present disclosure.

FIG. 8 is a graph showing the area specific resistance degradation (ASRD) of interconnects in a solid oxide fuel cell stack, formed from pre-alloyed Cr/Fe powders. The square points are for comparative pre-alloyed interconnects that did not include additional deposited iron, and the circular points are for exemplary pre-alloyed interconnects that included additional deposited iron. As can be seen in FIG. 8, the exemplary interconnects each had a lower average ASRD value than that of the comparative interconnects. Further, it can be seen that there was a lower contact resistance between the exemplary interconnects including contact layers and a nickel mesh, over time.

Figure 9:
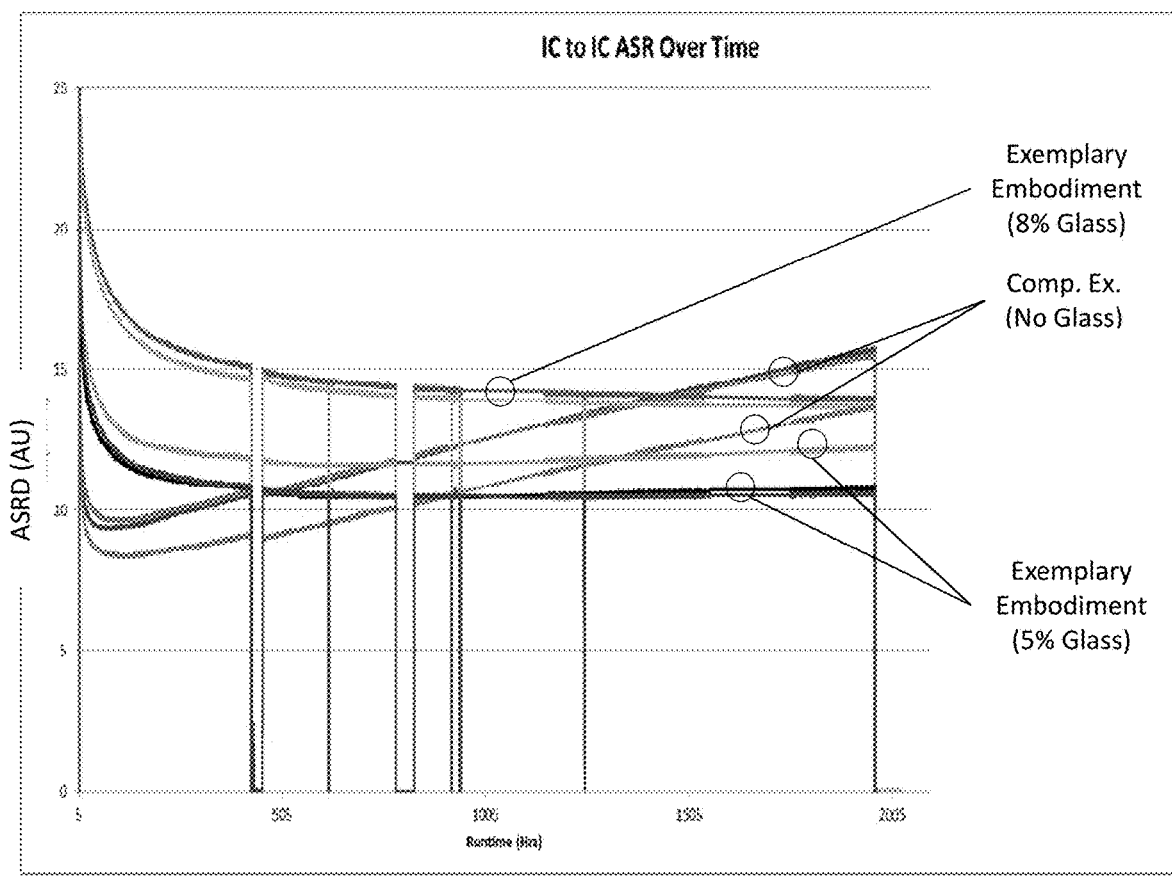
FIG. 9 is a chart showing area specific resistance degradation (ASRD) values of exemplary and comparative interconnects, according to various embodiments of the present disclosure.

FIG. 9 is a graph showing area specific resistances of interconnect to cell interfaces for exemplary CCLs that included glass and comparative CCLs that did not include glass, over 2000 hours of SOFC stack operating conditions. Referring to FIG. 9, the exemplary CCLs exhibited lower area specific resistances over time, as compared to the comparative CCLs, even though they initially exhibited a higher area specific resistances over the first 1000 to 2000 hours.

Figure 10:
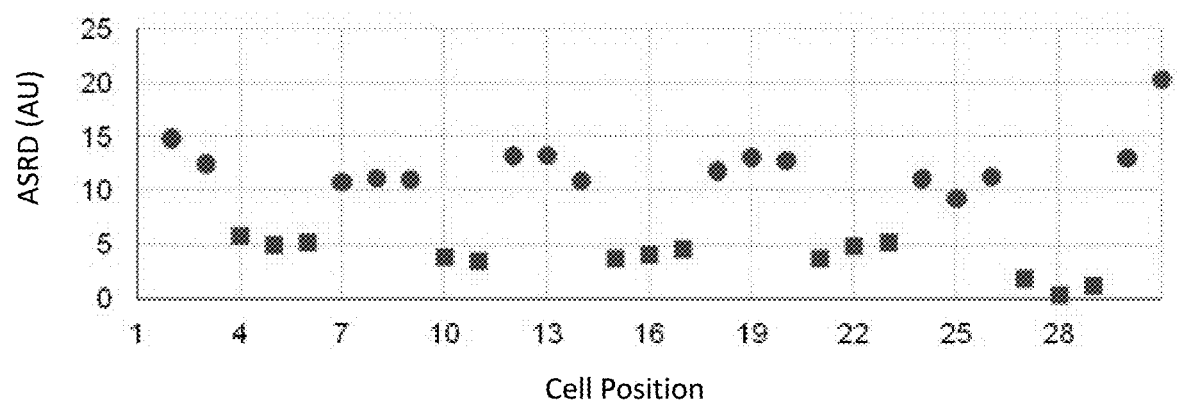
FIG. 10 is a chart showing area specific resistance degradation (ASRD) values of exemplary and comparative interconnects disposed in a fuel cell stack, according to various embodiments of the present disclosure.

FIG. 10 is a chart showing area specific resistance degradation (ASRD) values of exemplary and comparative interconnects disposed in a solid oxide fuel cell stack, according to various embodiments of the present disclosure. The square points are for comparative interconnects that did not include glass material in the CCL 42, and the circular points are for exemplary interconnects that included glass material in the CCL. As can be seen in FIG. 10, the exemplary interconnects each had a lower average ASRD value (e.g. at least 30% lower, such as at least 50% lower, e.g., 50 to 200% lower) than that of the comparative interconnects after 4000 hours of testing.

According to various embodiments, it was determined that is the addition of a glass sintering aid improve the performance of CCLs by reducing area specific resistance degradation. In addition, the addition of glass also allowed for CCLs to be self-healing, with the ability to heal cracks formed during thermal cycling.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell interconnect, comprising:
   fuel channels at least partially defined by first ribs disposed on a first side of the interconnect;
   oxidant channels at least partially defined by second ribs disposed on an opposing second side of the interconnect; and
   a cathode contact layer located only over tips of the second ribs but not over the oxidant channels, the cathode contact layer comprising a conductive metal oxide and a glass material having a glass transition temperature ranging from about 450° C. to about 550° C., wherein the glass material remains viscous at all temperatures from about 400° C. to about 900° C.

2. The interconnect of claim 1, further comprising a protective layer disposed on tips of the second ribs, wherein the cathode contact layer is disposed on the protective layer over tips of the second ribs but not over sidewalls of the second ribs or over the oxidant channels.

3. The interconnect of claim 1, wherein:
   the cathode contact layer comprises from about 4 wt % to about 10 wt % of the glass material, based on the total weight of the cathode contact layer.

4. The interconnect of claim 1, wherein the conductive metal oxide comprises $La_{1-x}Sr_xMnO_3$, where $0.1 \leq x \leq 0.3$.

5. The interconnect of claim 1, further comprising a contact layer disposed on tips of the first ribs, the contact layer comprising from about 20 wt % to about 80 wt % iron, based on the total weight of the contact layer.

6. A solid fuel cell stack comprising:
   solid oxide fuel cells; and
   interconnects of claim 2 disposed between the solid oxide fuel cells,
   wherein the cathode contact layers contact cathodes of the solid oxide fuel cells.

7. The solid fuel cell stack of claim 6, wherein the cathode contact layer of each interconnect is coated only over tips of the second ribs and the cathode contact layer contacts only portions of the cathodes that face the tips of the second ribs.

8. The solid fuel cell stack of claim 7, wherein the cathode contact layer of each interconnect comprises discrete segments that contact only portions of the cathode that faces the tips of the second ribs.

9. The solid fuel cell stack of claim 8, wherein the cathode contact layer of each interconnect is absent over a portion of the cathode that faces the oxidant channels.

10. The interconnect of claim 5, wherein:
the contact layer comprises from about 20 wt % to about 80 wt % iron and from about 80 wt % to about 20 wt % chromium, based on the total weight of the contact layer; and
an iron to chromium ratio of the contact layer varies in a thickness direction of the contact layer such that the iron to chromium ratio decreases as a distance from the tips of the first ribs increases.

11. The interconnect of claim 1, wherein the cathode contact layer of each interconnect comprises continuous discrete segments that continuously extend along the entire length of the tips of the second ribs.

* * * * *